United States Patent [19]
Pattengill et al.

[11] Patent Number: 5,325,816
[45] Date of Patent: Jul. 5, 1994

[54] POROUS ANIMAL LITTER

[75] Inventors: Maurice G. Pattengill, Golden; Jerry D. Glynn, Aurora; Martin A. Jones, Boulder, all of Colo.

[73] Assignee: Western Aggregates, Inc., Boulder, Colo.

[21] Appl. No.: 108,472

[22] Filed: Aug. 18, 1993

[51] Int. Cl.$^5$ ............................................. A01K 1/015
[52] U.S. Cl. .................................................. 119/173
[58] Field of Search ........................ 119/165, 171, 173

[56] References Cited

U.S. PATENT DOCUMENTS

| | | | |
|---|---|---|---|
| 3,747,564 | 7/1973 | Bickoff et al. . | |
| 3,776,188 | 12/1973 | Komakine | 71/1 X |
| 3,921,581 | 11/1975 | Brewer . | |
| 4,129,094 | 12/1978 | Stockel . | |
| 4,159,008 | 6/1979 | Bavaveas | 119/171 |
| 4,437,429 | 3/1984 | Goldstein et al. | 119/173 |
| 4,676,196 | 6/1987 | Lojek et al. . | |
| 5,079,201 | 1/1992 | Chu et al. | 119/173 X |
| 5,188,064 | 2/1993 | House | 119/173 X |

FOREIGN PATENT DOCUMENTS

| | | | |
|---|---|---|---|
| 4101243 | 7/1992 | Fed. Rep. of Germany | 119/171 |
| 240942 | 10/1988 | Japan | 119/171 |

*Primary Examiner*—Robert P. Swiatek
*Attorney, Agent, or Firm*—Blake T. Biederman; Edward A. Steen

[57] ABSTRACT

A waterproof receptacle for use in the disposal of animal waste products. The litter receptacle contains a layer of porous expanded shale. The porous shale has a porosity of at least 10% by volume for reducing bulk density of the porous shale and an ability to absorb liquid waste upwardly. Advantageously, the porous structure allows a portion of the liquid to flow to the bottom of the receptacle for subsequent upward absorption. Most advantageously, a screen size of at least +50 mesh (300 microns) is maintained to limit dusting. Optionally, 5 to 25% by weight ammonia absorbing zeolite may be added for odor control.

19 Claims, No Drawings

POROUS ANIMAL LITTER

FIELD OF INVENTION

This invention relates to absorbent materials useful for absorbing liquid waste. In particular, this invention relates to animal litters useful for absorbing animal waste.

BACKGROUND OF THE INVENTION

Moisture absorbent clays have historically been used as absorbent animal litters. Most clays used for animal litters are believed to contain smectites or other water-swellable clays, such as the polygorskite group clays, for liquid absorption. Smectite clays can increase several times by volume when absorbing water. This increase in volume can cause severe sewer damage when quantities of smectite clay are flushed down a toilet. Problems with moisture absorbent clays also include "dusting" upon pouring animal litters into a container and "mudding" upon urination of an animal into the clay. Controlling the volume fraction of fine material helps control the dusting and mudding problems. These "dust-free" animal litters have been enjoying an increased market share in recent years. However, breakage that occurs during shipping and handling typically produces a small amount of dust that can not be avoided.

When an animal urinates on a clay-based cat litter, a small pool of urine can quickly form on the top surface of the animal litter. The urine will subsequently soak into the animal litter and form a fairly large moist area. This moist area will tend to be avoided by cats upon subsequent visits to a litter box. Ammonia formed during the biological breakdown of the urine acts as a transfer agent of objectionable odors. Zeolites such as clinoptilolite have been mixed into some clay based animal litters for ammonia absorption to limit transfer of odors. The zeolite additions have been found to significantly reduce odors arising from the biological breakdown of urine.

For an animal litter to compete with clay based animal litters, it must possess good absorption characteristics, resistance to dusting and an acceptable bulk density. Several alternate materials have been proposed for use as animal litters. For example, Lojek et al., in U.S. Pat. No. 4,676,196, disclose a mixture of (limestone, alfalfa or other fibre material), (Portland cement or plaster of Paris) and a binder for holding the ingredients together. Bickoff et al., in U.S. Pat. No. 3,747,564, disclose use of a pressed, washed and dehydrated vegetative material as an animal litter. A combination of ferrous sulfate hepta-hydrate with fly ash or dried fine powders of zeolite for use as an animal litter is disclosed by Komakine in U.S. Pat. No. 3,776,188. R. F. Stockel, in U.S. Pat. No. 4,129,094, disclosed use of fly ash, bottom ash and/or boiler slag as a cat litter. As far as known, none of the above alternative animal litters have been able to successfully compete commercially with water-absorbent clay based animal litters.

It is an object of this invention to provide a clay-substitute animal litter that can match or exceed existing clay-based animal litters with regard to absorption characteristics, resistance to dusting and bulk density.

It is a further object of this invention to provide a animal litter that can reduce the volume of animal litter wetted during urination.

SUMMARY OF THE INVENTION

The invention provides a waterproof receptacle for use in the disposal of animal waste products. The litter receptacle contains a layer of porous heat expanded shale. The porous expanded shale has a porosity of at least 10% by volume for reducing bulk density of the porous shale and an ability to absorb liquid waste. Advantageously, the porous structure allows a portion of the liquid to flow to the bottom of the receptacle for subsequent upward absorption. Because this litter is not clay-based, the material does not "mud" and stick to the bottom of the litter box. Most advantageously, a screen size of at least +50 mesh (300 microns) is maintained to limit dusting. Optionally, 5 to 25% by weight ammonia absorbing zeolite may be added for odor control.

DESCRIPTION OF PREFERRED EMBODIMENT

It has been discovered that heat expanded porous shale provides an effective animal litter with rapid moisture absorption. For purposes of this specification, porous shale is defined as a heat expandable shale having a porosity of at least 10% by volume. Porous shale is produced by heating shale into its partial melting temperature wherein steam and gas evolved from organics produce a porous material of reduced density. For example, bulk density of shale used in the following experiment decreased in density from about 75 to 49 lb/ft$^3$ (1.2 to 0.8 g/cm$^3$) upon partial heating into the molten zone. Furthermore, it has been unexpectedly discovered that the animal litter reduces size of top surface wetted area of urination by allowing urine to pass to the bottom of the litter box and subsequently soak upwardly by capillary action. Having the majority of the animal litter near the bottom is believed to further facilitate odor control.

Commercial non-clumpable animal litters (Table 1, samples 1-13) and porous shale (Table 1, sample 14) were tested with respect to bulk density, absorption capacity, absorption rate, and resistance to attrition. The porous shale originated from Pierre shale mined and processed by Western Aggregates Inc. 11728 Highway 93, Boulder CO., 80303. Bulk density was calculated by pouring material into a 250, 500 or 1,000 ml glass or plastic graduated cylinder or a 1/10 ft$^3$ (2,832 cm$^3$) or a ¼ ft$^3$ (7,079 cm$^3$) bucket. The largest container that could be used in view of the size of sample available was used for each test. The weight of the sample per unit volume was then calculated to determine the bulk density of the sample. The absorption rates were determined by a modification of Federal Specification P-A-1056 (Feb. 2, 1976) "Absorbent Material, Oil and Water (For Floors and Decks). "A 9 in. (22.9 cm)×30 mm inside diameter glass tube having an 18 mesh (1000 micron) screen cloth attached on one end was filled with a sample. Material that fell through the screen was placed back on top of the sample. Distilled water was slowly poured into the tube until the first drop appeared. The sample was then allowed to drain for 30 minutes. After draining, the sample was weighed to calculate absorption capacity. Absorption rate was calculated by filling the above glass tube (having a screen cloth attached to the bottom end) with a sample and immersing the glass tube 1 ⅝ in. (4.1 cm) into a 4 ¼ in. (10.8 cm) inside diameter container filled with distilled water. The time required to saturate a sample to a height 3 inches (6.4 cm) from the bottom of the tube was recorded. Resistance to attrition was obtained by dry screening a −6 mesh +30 mesh (−3350 micron +600 micron) fraction of each sample. A 50 gram sample and 300 steel balls having a diameter of approximately ¼ in. (0.64 cm) and a weight of about 355 grams were placed into an 8 in. (20 cm) diameter brass screen pan, then into a Ro-Tap shaking machine for 20 minutes. The percent passing a 100 mesh screen (150 microns) after 20 minutes of grinding was determined to simulate the breakdown of the sample during shipping and handling. The percent break-down of the sample was then calculated. (All of the above tests were performed at 20° C.)

A summary of the results is provided in Table 1 below:

TABLE 1

| SAMPLE NO. | ABSORPTION (H$_2$O) | | | BULK DENSITY | | RESISTANCE TO ATTRITION (% LOSS) |
|---|---|---|---|---|---|---|
| | (GAL/FT$^3$) | l/m$^3$ | TIME (MIN) | LB/Ft$^3$ | g/cm$^3$ | |
| 1 | 3.6[1] | 481[1] | >10[1] | 44.5 | 0.713 | 1.2 |
| 2 | 4.2[1] | 561[1] | >10[1] | 45.9 | 0.735 | 2.6 |
| 3 | 3.7[1] | 495[1] | 0.5[1] | 43.6 | 0.698 | 0.8 |
| 4 | 3.2 | 428 | 9.0 | 39.9 | 0.639 | 0.2 |
| 5 | 3.1[1] | 414[1] | 2.7[1] | 39.1 | 0.626 | 0.4 |
| 6 | 3.0[1] | 401[1] | 8.5[1] | 46.3 | 0.742 | 1.6 |
| 7 | 3.0[1] | 401[1] | 2.9[1] | 39.0 | 0.625 | 0.8 |
| 8 | 3.0 | 401 | 3.3 | 46.5 | 0.745 | 0.6 |
| 9 | 2.8 | 374 | 3.0 | 46.3 | 0.742 | 0.6 |
| 10 | 2.8 | 374 | >10 | 46.3 | 0.742 | 0.8 |
| 11 | 2.6 | 348 | 4.1 | 25.6 | 0.410 | 0.4 |
| 12 | 2.5 | 334 | 5.3 | 42.0 | 0.673 | 0.4 |
| 13 | 2.5 | 334 | 0.3 | 42.0 | 0.673 | 1.0 |
| 14 | 2.5 | 334 | 0.1 | 48.6 | 0.778 | 2.2 |

[1] These products showed significant "mudding" during testing involving water.

The porous shale animal litter (sample 14) provided comparable properties to commercial clay based products. In fact, the porous shale sample provided the most rapid absorption of all samples tested.

A mineralogical comparison, by weight percent, of one selected commercial non-clumping clay animal litter (sample 4) and a porous shale mixture (sample 14) is provided in Table 2 below:

TABLE 2

| MINERAL | SAMPLE NO. 4 | SAMPLE NO. 14 |
|---|---|---|
| SMECTITE | 45 | — |
| MICA/ILLITE | 5 | — |
| PALYGORSKITE | — | — |
| KAOLINITE | — | — |
| CHLORITE | — | — |
| QUARTZ | 7 | 10 |
| CRISTOBALITE[1] | 35 | — |
| PLAGIOCLASE FELDSPAR | — | 5 |
| K-FELDSPAR | — | <5 |
| CLINOPTILOLITE | <5 | — |
| CLINOPYROXENE | — | <5? |
| CALCITE | — | — |
| DOLOMITE | — | — |
| SIDERITE | — | — |
| GYPSUM | — | — |
| ANALCIME | — | — |
| "AMORPHOUS" | — | >70 |
| "UNIDENTIFIED" | <5 | <5 |

(1) This phase fits the available "JCPDS" (Joint Committee on Powder Diffraction Standards) data for cristobalite. However, a controversy exists over whether this phase (occurring in clay samples) is truly cristobalite or an "opaline silica" such as opal-ct. Opal-ct has been defined as "microcrocrystalline cristobalite" in a matrix of amorphous silica, but this definition is now being questioned. The term "opaline" implies that the phase is hydrated and may not be crystalline or entirely crystalline.

The above mineralogical compositions were obtained by X-ray diffraction analyses. As the data shows, the percent amorphous or "glassy" phase of porous shale (sample No. 14) was >70%. The amorphous phase is believed to be, in part, due to the partial melting of the shale during heat treatment. It is noted that any heat expandable shale such as Pierre shale or Kiowa shale may be used to produce the porous shale. Advantageously, the porous expanded shale is further characterized by having at least 30 weight percent amorphous material. Most advantageously, the porous expanded shale contains at least 50 weight percent amorphous material. The expanded shale has a porous sponge-like structure for absorbing liquids. Size of pores or voids in the shale ranged from 12.5 microns to 1,062.5 microns. These hydrophilic porous shales are easily wetted by water-based liquid wastes and the voids are believed to hold a portion of the liquid waste. Apparently, commercial sample number 4 primarily relies upon smectite (water-expanding clay) for moisture absorption. With the porous shale structure of the invention, smectite-free mixtures may readily be produced with ample water-absorbing capacity.

The porous structure provides for simplified addition of odor control agents. It is believed that perfumes and other liquid-activated odor control agents may be easily added to the porous shale structure. Effective odor control may also be provided by mixing a zeolite into the porous shale mixture. Some zeolites preferably absorb ammonia to limit transfer of noxious odors. Up to 50% ammonia absorbing zeolite is preferably added to an expanded shale aggregate. Since zeolites tend to slightly increase bulk density of the cat litter box, it is recommended that the animal litter contains only 5 to 25 weight percent ammonia absorbing zeolite. The zeolite clinoptilolite supplied by Rocky Mountain Zeolites has been found to be particularly effective for odor control.

Advantageously, the porous shale is screened to remove fines that tend to cause dusting during pouring. Limiting the shale to +30 mesh (600 microns) or 50 mesh (300 microns) tends to provide effective dusting control. The most preferred size distribution is −8 mesh (2,360 microns) to +30 mesh (600 microns) or +50 mesh (300 microns). Although larger sizes may be used without detrimentally affecting animal litter performance. Advantageously, the porous shale used has a bulk density of less than 1 g/cm³ (6.24 lb/cu.ft.). Most advantageously, bulk density is less than 0.85 g/cm³ (53.0 lb/cu.ft.).

Optionally, the porous shale may be mixed with a smectite clay for clumpability. Bentonite mixed with porous shale was found to provide a "clumpable" animal litter. A mixture of at least about 30 weight percent smectite is required to place the mixture into a form that clumps upon contact with liquid. After a few minutes, the dried clump may then be removed from the litter container.

The porous shale animal litter of the invention provides an animal litter with acceptable absorption capacity and an improved absorption rate. The expanded porous shale has a bulk density as low as less than 0.8 g/cm³ (49.9 lb/cu.ft.) that is similar to existing clay based animal litters. Furthermore, the porous animal litter provides a unique absorbent characteristic wherein a portion of the liquid waste is allowed to flow to the bottom of a waterproof receptacle for subsequent upward absorption without "mudding" and sticking to the bottom of the litter pan. This is believed to help odor control by reducing the size of the surface pool of urine and concentrating animal litter near the bottom of a litter box. Finally, the porous shale may be easily dry screened to a dust-free size fraction with good resistance to attrition.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. A waterproof litter receptacle for use in disposal of animal waste products, said litter receptacle containing a layer of porous expanded shale, said porous shale having a porosity of at least 10% by volume for reducing bulk density of said porous shale and said porous shale having an ability to absorb liquid waste upwardly from said bottom of said receptacle.

2. The litter receptacle of claim 1 wherein up to 50% by weight ammonia absorbing zeolite is mixed into said layer of porous shale for odor control.

3. The like receptacle of claim 1 wherein 5 to 25% by weight ammonia absorbing zeolite is mixed into said layer of porous shale for odor control.

4. The litter receptacle of claim 1 wherein said porous shale layer has a structure that allows a portion of urine originating from an animal to flow to said bottom of said litter container for subsequent upward absorption.

5. The litter receptacle of claim 1 wherein said porous shale has a size distribution primarily between about −8 mesh and +50 mesh (−2360 to +300 microns).

6. The litter receptacle of claim 1 wherein a water-swellable smectite clay is mixed into said porous shale to provide a clumpable litter.

7. The litter receptacle of claim 1 wherein the porous shale has a bulk density of less than 1 g/cm³ (62.4 lb/cu.ft.).

8. A waterproof litter receptacle for use in disposal of animal waste products, said litter receptacle containing a layer of porous expanded shale, said porous shale having a porosity of at least 10% by volume for reducing bulk density of said porous shale to a level below at least 1 g/cm³, (62.4 lb/cu.ft.) said porous shale having an ability to absorb liquid waste upwardly from said bottom of said receptacle and said porous shale having a structure that allows a portion of urine originating from an animal to flow to the bottom of said litter receptacle for subsequent upward absorption.

9. The litter receptacle of claim 8 wherein up to 50% by weight ammonia absorbing zeolite is mixed into said layer of porous shale for odor control.

10. The litter receptacle of claim 8 wherein 5 to 25% by weight ammonia absorbing zeolite is mixed into said layer of porous shale for odor control.

11. The litter receptacle of claim 10 wherein said ammonia absorbing zeolite is clinoptilolite.

12. The litter receptacle of claim 8 wherein said porous shale has a size distribution primarily between about −8 mesh and +50 mesh (−2360 to +300 microns).

13. The litter receptacle of claim 8 wherein the bulk density consists essentially of porous shale with up to 50% by weight zeolite.

14. A method of controlling disposal of animal waste comprising the steps of:
   providing a litter container capable of holding liquids without leaking,
   introducing a layer of porous expanded shale into said container, said porous shale being capable of upwardly absorbing liquid animal waste, and said shale having a porosity of at least 10% by volume, and
   collecting liquid animal waste with said layer of porous expanded shale by absorbing said liquid animal waste with said porous shale.

15. The method of claim 14 wherein up to 50% by weight ammonia absorbing zeolite is mixed into said layer of porous shale for odor control.

16. The method of claim 15 wherein 5 to 25% by weight ammonia absorbing zeolite is mixed into said layer of porous shale for odor control.

17. The method of claim 14 wherein said expanded shale layer has a structure that allows urine originating from an animal to flow to said bottom of said litter container for subsequent upward absorption.

18. The method of claim 14 wherein said porous shale has a size distributing primarily of −8 mesh to +50 mesh (−2360 to +300 microns).

19. The method of claim 14 wherein said porous shale has a bulk density of less than 1 g/cm³ (62.4 lb/cu.ft.).

* * * * *